(12) United States Patent
Ng et al.

(10) Patent No.: US 8,826,133 B2
(45) Date of Patent: Sep. 2, 2014

(54) ENHANCED 3D SOUND

(75) Inventors: Chern Ann Ng, Singapore (SG); Min-Liang Tan, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 1046 days.

(21) Appl. No.: 12/282,048

(22) PCT Filed: Mar. 6, 2006

(86) PCT No.: PCT/US2006/007880
§ 371 (c)(1), (2), (4) Date: Jun. 4, 2010

(87) PCT Pub. No.: WO2007/102805
PCT Pub. Date: Sep. 13, 2007

(65) Prior Publication Data
US 2010/0241959 A1   Sep. 23, 2010

(51) Int. Cl.
G06F 3/00 (2006.01)
G06F 3/16 (2006.01)
G06F 3/0481 (2013.01)

(52) U.S. Cl.
CPC ............ G06F 3/165 (2013.01); *G06F 3/04815* (2013.01); *G10H 2210/301* (2013.01)
USPC ............................ 715/716; 715/727; 715/728

(58) Field of Classification Search
CPC .............. G10H 2210/301; G06F 3/165; G06F 3/04815
USPC ......................................... 715/716, 727, 728
See application file for complete search history.

(56) References Cited

U.S. PATENT DOCUMENTS

| | | | |
|---|---|---|---|
| 6,798,889 B1 * | 9/2004 | Dicker et al. ................. | 381/303 |
| 6,990,456 B2 | 1/2006 | Fay et al. | |
| 7,158,844 B1 * | 1/2007 | Cancilla .......................... | 700/94 |
| 7,698,009 B2 * | 4/2010 | Cotey et al. ..................... | 700/94 |
| 7,702,117 B2 * | 4/2010 | Crocitti et al. ................ | 381/109 |
| 7,935,879 B2 * | 5/2011 | Transeau ........................ | 84/604 |
| 7,957,547 B2 * | 6/2011 | Chin .............................. | 381/306 |
| 8,401,682 B2 * | 3/2013 | Beckmann et al. ............. | 700/94 |
| 8,706,275 B2 * | 4/2014 | Peterson et al. ................ | 700/94 |
| 2003/0204364 A1 * | 10/2003 | Goodwin et al. ............. | 702/152 |
| 2005/0075882 A1 * | 4/2005 | Fay et al. ....................... | 704/270 |
| 2005/0259833 A1 * | 11/2005 | Scarpino et al. ................ | 381/98 |
| 2009/0063414 A1 * | 3/2009 | White et al. ...................... | 707/3 |
| 2011/0016397 A1 * | 1/2011 | Sapp et al. ..................... | 715/728 |

FOREIGN PATENT DOCUMENTS

| | | |
|---|---|---|
| KR | 1020040034442 | 4/2004 |
| WO | 0150598 A2 | 7/2001 |
| WO | 0150598 | 12/2001 |

OTHER PUBLICATIONS

International Search Report dated Aug. 1, 2006 for International Application No. PCT/US2006/007880.
Korean Office Action dated Jun. 27, 2012 for application No. 10-2008-7024440.

* cited by examiner

*Primary Examiner* — David Phantana Angkool
(74) *Attorney, Agent, or Firm* — Novak Druce Connolly Bove + Quigg LLP

(57) ABSTRACT

A system and method are disclosed for providing improved 3D sound experience to a user. The sound generation layer is customizable to allow the user and/or application provider to modify the internal rules the sound generation layer uses to render sounds, to amplify sounds that fall below a pre-set or user-set volume level, and to specifically amplify/soften certain sounds (such as game specific sounds like gunfire or footsteps), or specific frequencies of sounds. A graphical user interface can communicates with the sound generation layer to handle any or all the above, so that a lay user can easily adjust these settings without having to understand the underlying algorithms.

28 Claims, No Drawings

ENHANCED 3D SOUND

CROSS-REFERENCE TO RELATED APPLICATION

The present application is a National Phase entry of PCT Application No. PCT/US2006/007880, filed Mar. 6, 2006, hereby incorporated herein by reference.

STATEMENT REGARDING FEDERALLY SPONSORED RESEARCH OR DEVELOPMENT

Not Applicable.

FIELD OF THE INVENTION

The present invention relates generally to the field of audio equipment, and more particularly to enhancing the audio experience of users of software applications having 3D sound.

BACKGROUND OF THE INVENTION

Currently, software applications that make extensive use of a 3D sound stage, such as computer games, typically use one of a few general application program interfaces ("APIs"), such as DirectSound3D® from Microsoft Corporation, or the open standard OpenAL, to communicate data. That data includes, for example, the sounds' position relative to the listener, including the direction, height, distance, initial volume, any distortion effects, and the actual audible noise itself. That data is transmitted to the sound software/hardware that is responsible for the actual physical generation of the sound (the "Sound Generation Layer," or "SGL"). The SGL comprises the interface API (e.g., DirectSound3D®), the sound card/hardware's software driver, and the sound generation hardware.

The SGL then handles the actual generation of the physical sound based on the data received from the software application. Based on its internal rules, the SGL may decide to reduce the volume of a sound (e.g., a gunshot) to simulate the sound originating as further away from the listener's position. Alternatively, the SGL may be instructed to play the same gunshot sound but simulated at three different positions, and hence would choose which speakers (in potentially varying configurations), the volume, and the balance at which to play the three gunshots. Depending on how successful the SGL is at this, the listener should believe that these would be three distinct shots fired from three different positions despite being the same identical sound file being played.

Certain computer games, such as first person shooter games, provide a large range of audio cues to inform the player of the game such information like enemy footsteps approaching from the rear, rockets whooshing overhead, or an enemy hiding behind a box but quietly reloading his weapon. All this information is particularly critical in a competitive environment, but users are unable to customize the way this information is presented to them. Of course, such information makes generally improves the audio experience of the user of this or other audio applications.

It is thus desirable that the user have available a system and method that allows customization. While peripherally, users may adjust their volume controls so that softer, further away sounds may be heard more clearly, or adjust software/hardware equalizer controls to amplify sounds at specific frequencies, neither of these is particularly satisfactory. Adjusting volumes of soft sounds also mean loud sounds are adjusted.

SUMMARY OF THE INVENTION

An improved 3D sound experience may be provided with several components described herein. These are primarily intended to be implemented via changes to the SGL at the sound driver level, although it is also possible to implement at the sound hardware level:

1. Allowing the user and/or application provider to modify the internal rules the SGL uses to render sounds (e.g., how much softer to play sounds that are further away).
2. Allowing users to amplify sounds that fall below a pre-set or user-set volume level, while leaving sounds that are above this level untouched
3. Allowing users to specifically amplify/soften certain sounds (such as, in the case of games, game-specific sounds like gunfire or footsteps), or specific frequencies of sounds.
4. A graphical user interface that communicates with the SGL to handle any or all the above, so that a lay user can easily adjust these settings without having to understand the underlying algorithms.

In accordance with a first aspect of the invention, there is disclosed a sound processing method comprising: detecting an available sound generatable within an environment by an application, the available sound having at least one property associated therewith, the at least one property comprising at least one of an identifier, sound characteristics, a sound type and environment-based parameters associated with the available sound; identifying one of a plurality of processing rules associated with the at least one property, the identified one of the plurality of processing rule for generating the available sound based on the at least one property; and identifying one of a plurality of modifier rules associated with at least one of the at least one property and the identified one of the plurality of processing rules, wherein the available sound is subsequently generatable by the identified one of the plurality of processing rules modified by the identified one of the plurality of modifier rules.

In accordance with a second aspect of the invention, there is disclosed a machine-readable medium having stored therein a plurality of programming instructions, which when executed, the instructions cause the machine to: detect an available sound generatable within an environment by an application, the available sound having at least one property associated therewith, the at least one property comprising at least one of an identifier, sound characteristics, a sound type and environment-based parameters associated with the available sound; identify one of a plurality of processing rules associated with the at least one property, the identified one of the plurality of processing rule for generating the available sound based on the at least one property; and identify one of a plurality of modifier rules associated with at least one of the at least one property and the identified one of the plurality of processing rules, wherein the available sound is subsequently generatable by the identified one of the plurality of processing rules modified by the identified one of the plurality of modifier rules.

In accordance with a third aspect of the invention, there is disclosed a sound generation layer (SGL) for a computing system, the SGL comprising: an application programming interface (API) for providing an available sound for an environment, the available sound having at least one property associated therewith, the at least one property comprising at least one of an identifier, sound characteristics, a sound type and environment-based parameters associated with the available sound; a driver for mediating data communication between the API and a sound generation hardware, the driver further for providing a plurality of processing rules and for identifying one of the plurality of processing rules associated with the at least one property, the identified one of the plurality of processing rule for generating the available sound based on the at least one property; and an application module for providing a plurality of modifier rules and for identifying one of a plurality of modifier rules associated with at least one of the at least one property and the identified one of the plurality of processing rules, wherein the available sound is subsequently generatable via the driver according to the identified one of the plurality of processing rules modified by the identified one of the plurality of modifier rules.

The above summary of the present invention is not intended to represent each embodiment, or every aspect, of the present invention. The detailed description and figures will describe many of the embodiments and aspects of the present invention.

The above summary of the present invention is not intended to represent each embodiment, or every aspect, of the present invention. The detailed description and figures will describe many of the embodiments and aspects of the present invention.

DESCRIPTION OF PREFERRED EMBODIMENTS

As summarized above, embodiments of the invention provide a system and method for providing an improved user experience for 3D applications, such as software.

Customizing the SGL

Allowing customization of the internal rules the SGL uses to render sounds provides much greater flexibility to the overall user experience. For example, the user could change how much softer to play sounds that are further away.

Typically, a software application, such as a game, will send the positional information of a 3D sound to the SGL, and allow the SGL to determine how the physical sound itself is generated. Different SGLs by default handle this information differently. A different combination of API, sound driver and sound hardware may play sounds that are far away from a listener's position at completely different volumes.

For example, on a Creative® soundcard that implements both the DirectSound3D® and OpenAL APIs, if the SGL with the DirectSound3D® API is used, sounds that are far away are played more softly, or sometimes not at all, compared to the OpenAL SGL implementation. In this example, the DirectSound3D® SGL effectively makes a decision to "cut-off" sounds that have been arbitrarily decided as too far away for the listener to "hear," corresponding to a "maximum audible range." The reasons for this may be to reduce the number of sounds being played simultaneously (for purposes of reducing load on the sound hardware or other performance reasons), or for purposes of realism. In any event, this limit is arbitrarily decided in advance and is currently not adjustable.

A change made at the sound driver or hardware level of the SGL allows the user (or, alternatively, the application programmer) to decide at what "distance" the maximum audible range should be for sounds of various volumes. Therefore, if the software application sends the 3D sound data, the user may adjust whether or not this sound is actually played, and also the amount of volume drop off based on this distance. The specific algorithms to calculate this drop off are adjusted based on the user's input, so that the values used depend on the user's individual preferences, without necessarily exposing these algorithms to the lay user.

This is particularly useful for game-critical sounds which are usually quite soft, such as footsteps that are far away, or silenced gunshots. In effect, this change allows a user to specify that, if the game provides that a sound should be available (by providing the sounds 3D data to the API), the user can "insist" on having it played by the SGL. Coupled with a GUI (such as, but not necessarily, the ones described in 4), this provides a lay user greater flexibility in how he or she receives 3D audio cues and may provide a competitive advantage, in that he or she will be able to hear sounds at a greater "range" compared to opponents with non-adjustable sound solutions that have sound ranges arbitrarily set low; adjustability has the added advantage of tweaking an optimum "range" since playing too many sounds at once may have a detrimental effect on the performance of the software application due to CPU load. This method can be combined with any of the other methods described here.

Amplification of Soft Sounds

The SGL may also be modified to allow amplification of sounds falling below a pre-set or user-set volume level, while leaving sounds that are above this level unmodified. This is analogous to a process known as normalization, used in DVD players where softer sounds, such as dialogue, are amplified so that they are audible without the watcher having to adjust his or her volume to the point where loud sounds such as explosions become too loud (or disturb the neighbors).

The inventive step here is allowing the user to tweak the amount of amplification to apply, and at what point this amplification should be done. Any and all sounds that fall below a preset or a user-set volume are amplified to another preset or user-set volume (e.g. all sounds that fall below −90 db are amplified arbitrarily to −85 db).

Ambient sounds (such as wind blowing, sound tracks in games) which typically are not handled as 3D sounds, could be selectively excluded from this selective amplification (as these sounds do not contain 3D data and are considered "traditional" sound sources), the advantage being that ambient sounds often do not contain critical information and may be distracting if they are amplified (i.e. the 3D footstep sounds are amplified, but the "ambient" sound of wind blowing is left quite soft). This method can be combined with any of the other methods described here.

Amplification of Selected Sounds

The SGL may also be modified so that it can identify specific sounds (which are effectively software files) and allows the user to selectively amplify these sounds, either on a scale (e.g., amplify all "gunshot.wav" sounds by 1.5 times) or a set minimum volume as described in 2 (e.g., amplify all "gunshot.wav" sounds to −85 db if they fall below −90 db). More generically, the SGL is modified so that specific frequencies, or ranges of frequencies have the above described rules applied, the effect being similar but with less granularity. The advantage here is that where the software application has decided a particular sound should be very soft (e.g. a silenced pistol shot), a user can decide to play this sound at a much louder volume, which may provide him or her with a significant advantage over an opponent in a competitive environment.

The inventive step is both the user adjustability and the selective amplification of specific sounds (although this may not hold true for selective frequency amplification).

Again, as in 2, ambient sounds may be selectively excluded from this process. This method may be combined with any of the other methods described here.

Graphical User Interface

In a preferred embodiment, the foregoing are adjusted via a graphical user interface at the sound driver level of the SGL. Existing sound card drivers have graphical user interfaces which graphically represent speaker positions relative to the listener for the purpose of testing of speakers or positioning of speakers (e.g., simulating a speaker being closer, further away or at a different angle from the listener's position when it is not possible or convenient to adjust the actual physical speaker positions themselves due to physical constraints). This implementation differs in that this deals from those GUIs in that, among other improvements, it includes control of the "range" in the virtual environment at which 3D sounds are generated by the SGL. Additionally, it may allow for sound-specific selections.

In one embodiment, the GUI includes a "radar"-like interface. The listener is graphically represented in the center of a ring that can be expanded or contracted graphically either by dragging on it with an input device such as a mouse, by means of a separate graphical slider, by inputting higher, or lower numbers or other similar methods as in 4b. The ring may represent several things:

i. The "distance" at which the arbitrary cut-off of soft sounds takes place as described in 1., by expanding or contracting the ring, the listener instructs the SGL to set this distance further or nearer the listener's relative position. This graphically shows that the user's listening range is "increased" or "decreased".

ii. The volume at which soft sounds should be amplified as described above. By expanding or contracting the ring, the user increases or decreases the level at which sounds which fall below a certain level are amplified. This graphically conveys also the user's listening range as "increased" or "decreased".

iii. Both i and ii, and any other similar implementations are there to convey the notion of increasing or decreasing the user's listening range, much like how current video drivers allow the user to specify the distance at which objects may be viewed in a 3D environment (a shorter range improves performance since fewer objects are drawn, a greater range improves the amount that the user is able to see).

In yet another embodiment, the GUI includes a "counter" interface. In this embodiment, the GUI includes a box where distance may be described in virtual units in numerals (or no units at all) rather than a ring slider; e.g., the number of virtual "feet" that a listener is able to hear, with a similar implementation to (i) and (ii), above. This counter may be adjusted via a slider, or by typing in by the user, or any other similar input method. For example, it can be combined with the method as described above, so that as the ring is made larger, the numbers in the counter go up, and vice versa. This allows the user to correlate the numbers with the listening range/distance in the user's mind.

While the present invention has been described with reference to one or more particular embodiments, those skilled in the art will recognize that many changes may be made thereto without departing from the spirit and scope of the present invention. For example, many of the advantages of the invention have been discussed in the context of games. Other applications of the invention are readily apparent, such as simulations, movies and other audiovisual entertainment media, music and other audio, and the like.

Each of these embodiments and obvious variations thereof is contemplated as falling within the spirit and scope of the claimed invention, which is set forth in the following claims.

What is claimed is:

1. A sound processing method for modifying three-dimensional (3D) sound in a virtual gaming environment, the 3D sound comprising a plurality of 3D sound data, each sound data having a property comprising a sound type, the method comprising:
   providing an interface for receiving a user input for selectively modifying a first 3D sound data having a first 3D sound data property;
   determining a first modifier rule based on the received user input, the first modifier rule associated with the first 3D sound data property;
   generating the first 3D sound data during application program execution;
   selectively modifying the generated first 3D sound data by the first modifier rule; and
   subsequently playing 3D sound as part of the virtual gaming environment using the modified first 3D sound data.

2. The method of claim 1, comprising selectively modifying the generated first 3D sound data by the first modifier rule in accordance with a first sound type.

3. The method of claim 1, wherein the sound type comprises any of an ambient sound, a dialogue sound, a footstep, and a weapon sound.

4. The method of claim 2, wherein the first sound type comprises any of a dialogue sound, a footstep and a weapon sound.

5. The method of claim 1, comprising determining a modifier rule to modify a volume of the first 3D sound data, the modifier rule selected from any of an amplification of the volume, and a reducing of the volume.

6. The method of claim 5, wherein the amplification of the volume comprises amplifying the volume of the first 3D sound data when the volume falls below a first determined volume level.

7. The method of claim 6, further comprising amplifying the volume of the first 3D sound data to a second determined volume level.

8. The method of claim 5, wherein an amplification of the volume of the first 3D sound data is carried out based on a frequency of the first 3D sound data.

9. The method of claim 1, wherein the interface further allows a user to selectively modify the first 3D sound data based on an environment-based parameter.

10. The method of claim 9, wherein the environment-based parameter is a maximum audible range for the first 3D sound data, and wherein the maximum audible range is applied in association with the first 3D sound data property, to determine a modifier rule.

11. The method of claim 1, further comprising receiving the first 3D sound data with an application programming interface (API), and determining options to be made available in the interface for receiving a user input to selectively modify the first 3D sound data.

12. The method of claim 1, wherein the interface comprises a radar-type interface, and wherein the user is graphically represented in a center of a ring that can be expanded or contracted graphically, using an input device.

13. The method of claim 1, wherein the interface comprises a counter, and wherein the counter corresponds to a distance that a user is able to hear in the virtual environment.

14. The method of claim 1, further comprising:
   providing an interface for receiving a user input for selectively modifying a second 3D sound data having a second 3D sound data property;

determining a second modifier rule based on the received user input, the second modifier rule associated with the second 3D sound data property;

generating the second 3D sound data during application program execution;

selectively modifying the generated second 3D sound data by the second modifier rule in accordance to a second sound type; and subsequently playing 3D sound as part of the virtual gaming environment using the modified second 3D sound data.

15. The method of claim 14, wherein the first sound type comprises any of a dialogue sound, a footstep and a weapon sound, the second sound type comprises an ambient sound, and wherein the first modifier rule is determined to modify a volume of the first 3D sound data, while the second modifier rule is determined to exclude the second 3D sound data from modification.

16. A non-transitory computer-readable medium having instructions stored thereon that when executed manipulates three-dimensional (3D) sound in a virtual gaming environment, the 3D sound comprising a plurality of 3D sound data, each sound data having a property comprising a sound type, the SGL comprising:

an application programming interface (API) for generating 3D sound data during application program execution;

a driver for mediating data communication between the API and a sound generation hardware, the driver further for:

providing an interface for receiving a user input for selectively modifying a first 3D sound data having a first 3D sound data property, determining a first modifier rule based on the received user input, the first modifier rule associated with the first 3D sound data property; and selectively modifying a generated first 3D sound data by the first modifier rule;

wherein the sound generation hardware subsequently plays 3D sound as part of the virtual gaming environment using the generated first 3D sound data in accordance with any selective modification of the generated first 3D sound data by the first modifier rule.

17. The non-transitory computer-readable medium of claim 16, wherein the driver selectively modifies the generated first 3D sound data by the first modifier rule in accordance with a first sound type.

18. The non-transitory computer-readable medium of claim 16, wherein the sound type comprises any of an ambient sound, a dialogue sound, a footstep and a weapon sound.

19. The non-transitory computer-readable medium of claim 17, wherein the first sound type comprises any of a dialogue sound, a footstep and a weapon sound.

20. The non-transitory computer-readable medium of claim 16, wherein the driver determines a modifier rule to modify a volume of the first 3D sound data, the modifier rule selected from any of an amplification of the volume, and a reducing of the volume.

21. The non-transitory computer-readable medium of claim 20, wherein the amplification of the volume comprises amplifying the volume of the first 3D sound data when the volume falls below a first determined volume level.

22. The non-transitory computer-readable medium of claim 21, wherein the driver amplifies the volume of the first 3D sound data to a second determined volume level.

23. The non-transitory computer-readable medium of claim 20, wherein an amplification of the volume of the first 3D sound data is carried out based on a frequency of the first 3D sound data.

24. The non-transitory computer-readable medium of claim 16, wherein the interface further allows a user to selectively modify the first 3D sound data based on an environment-based parameter.

25. The non-transitory computer-readable medium of claim 24, wherein the environment-based parameter is a maximum audible range for the first 3D sound data, and wherein the maximum audible range is applied in association with the first 3D sound data property, to determine a modifier rule.

26. The non-transitory computer-readable medium of claim 16, wherein the 3D sound data is received with the API, and the API determines options to be made available by the driver in the interface for receiving a user input to selectively modify the first 3D sound data.

27. The non-transitory computer-readable medium of claim 16, wherein the interface comprises a radar-type interface, and wherein the user is graphically represented in a center of a ring that can be expanded or contracted graphically, using an input device.

28. The non-transitory computer-readable medium of claim 16, wherein the interface comprises a counter, and wherein the counter corresponds to a distance that a user is able to hear in the virtual environment.

* * * * *